United States Patent
Okada

(10) Patent No.: US 9,917,973 B2
(45) Date of Patent: Mar. 13, 2018

(54) PRINTING APPARATUS, METHOD OF CONTROLLING THE SAME, AND STORAGE MEDIUM

(71) Applicant: CANON KABUSHIKI KAISHA, Tokyo (JP)

(72) Inventor: Hideyuki Okada, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/208,042

(22) Filed: Jul. 12, 2016

(65) Prior Publication Data

US 2017/0026538 A1    Jan. 26, 2017

(30) Foreign Application Priority Data

Jul. 23, 2015   (JP) ................. 2015-146080

(51) Int. Cl.
*G06F 3/12* (2006.01)
*H04N 1/23* (2006.01)

(52) U.S. Cl.
CPC ........... *H04N 1/2338* (2013.01); *G06F 3/124* (2013.01); *G06F 3/125* (2013.01); *G06F 3/1206* (2013.01); *G06F 3/1253* (2013.01); *G06F 3/1267* (2013.01); *H04N 2201/0094* (2013.01)

(58) Field of Classification Search
CPC ..... H04N 1/2338; G06F 3/1206; G06F 3/125; G06F 3/1253; G06F 3/124; G06F 3/1267

USPC ......................................................... 358/1.13
See application file for complete search history.

(56) References Cited

U.S. PATENT DOCUMENTS

| 8,717,598 B2 | 5/2014 | Okada | |
|---|---|---|---|
| 2007/0091341 A1* | 4/2007 | Yamada | G06K 15/005 358/1.12 |
| 2007/0188791 A1* | 8/2007 | Utsunomiya | H04N 1/00411 358/1.13 |
| 2013/0088736 A1* | 4/2013 | Kaneda | G06K 15/1817 358/1.13 |
| 2014/0293351 A1* | 10/2014 | Kurihara | G06F 3/1253 358/1.15 |
| 2014/0376023 A1 | 12/2014 | Anno et al. | |
| 2015/0153971 A1* | 6/2015 | Aoki | G06F 3/1206 358/1.15 |

FOREIGN PATENT DOCUMENTS

JP      2010-629 A    1/2010

* cited by examiner

*Primary Examiner* — Neil R McLean
(74) *Attorney, Agent, or Firm* — Fitzpatrick, Cella, Harper & Scinto

(57) ABSTRACT

A processing mode set for a received print job is determined, and based on the result of the determination, the print job is processed in a first processing mode in which processing for rendering from print data to image data and print processing based on the image data resulting from the rendering processing are executed in parallel, or in a second processing mode in which the print processing based on the image data is executed after the entire rendering processing for rendering from print data to image data is complete.

22 Claims, 12 Drawing Sheets

FIG. 9
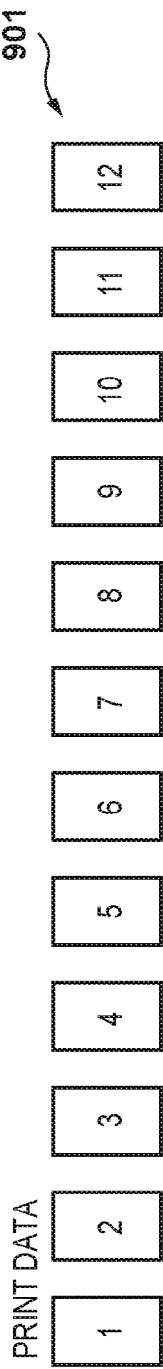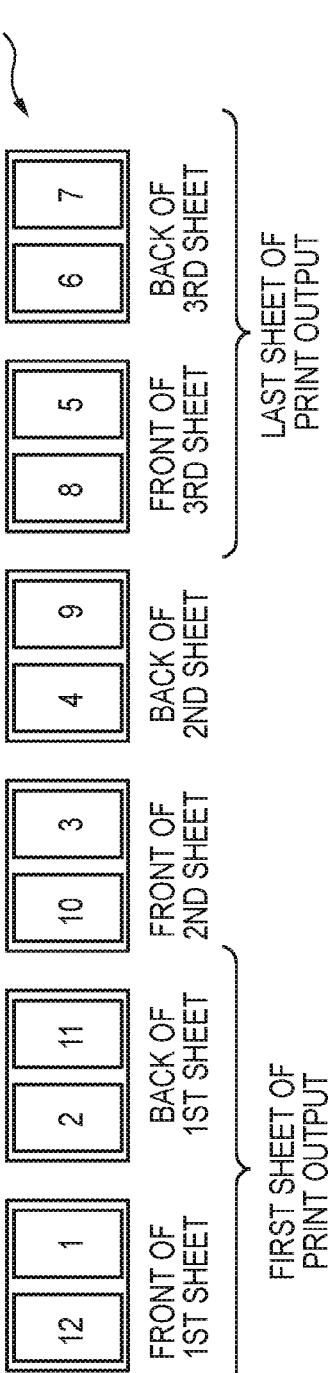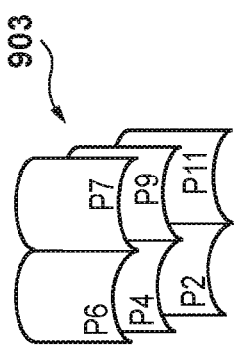

FIG. 10

Property

PAGE SETTING | FINISHING | PAPER SUPPLY | PRINT QUALITY

FAVORITE: STANDARD SETTING

1001
OUTPUT METHOD: HOLD

PRINTING METHOD: SINGLE-SIDED PRINT

☐ COMBINE SHEETS WITH DIFFERENT SIZES AND ORIENTATIONS

BOOKBINDING DETAILS

BINDING DIRECTION: LONG SIDE BINDING (LEFT)

BINDING MARGIN

DISCHARGE METHOD:

SORT
☑ SHIFT     ☐ ROTATE
☐ PUNCH-HOLES  ☐ Z FOLDING
☑ RIP THEN PRINT  1002

STAPLE POSITION DESIGNATION

A4 (SCALE: AUTO)

CHECK SETTINGS

FINISHING DETAIL | REVERT TO DEFAULT

OK | CANCEL | HELP

PRINTING APPARATUS, METHOD OF CONTROLLING THE SAME, AND STORAGE MEDIUM

BACKGROUND OF THE INVENTION

Field of the Invention

The present invention relates to a printing apparatus, a method of controlling the same, and a storage medium.

Description of the Related Art

With an image forming apparatus, a representative of which being an MFP (multi-function peripheral), in addition to copying and scanning functions, print data described in a page description language (PDL) can be received and printed. When an image forming apparatus prints based on print data described in PDL, there are two processing modes, namely "Rip While Print" and "Rip Then Print", which are selected based on the PDL data rendering processing and the processing sequence of the print processing. "Rip While Print" is a processing mode in which the image forming apparatus executes the PDL data rendering processing and the print processing in parallel, and when the rendering processing for the first page of image data is complete, the print processing for the first page is started immediately in parallel with the rendering processing for the second page of image data. On the other hand, "Rip Then Print" is a processing mode in which the image forming apparatus starts print processing after the rendering processing for all pages of the input PDL data has ended, and for example, if the print data includes 100 pages of image data, the print processing will not be started until the rendering processing for all 100 pages is complete.

Next, the advantages and disadvantages of the above-described two processing modes will be described. In the "Rip While Print" mode, printing is executed sequentially starting from pages for which the image data rendering processing is complete. For this reason, there is an advantage in that the amount of time from when the image forming apparatus starts the processing of the print data to when the first page is printed (FPOT: First Print Output Time) is shorter in comparison to the case of the "Rip Then Print" mode. Also, the "Rip While Print" mode is advantageous in that the amount of processing time from when the image forming apparatus starts processing of the print data to when all of the print data is printed is also shorter in comparison to the "Rip Then Print" mode.

However, there are cases in which image data that requires a large amount of time for the rendering processing is included in the print data. Processing print data including this kind of image data using the "Rip While Print" mode is disadvantageous in that the speed of the image data rendering processing becomes a bottleneck and print processing cannot be executed at the original speed. In other words, because printing does not start until the image data rendering processing of each page is complete, the printing apparatus cannot execute the print processing at the PPM (pages per minute) of maximum capability. Also, because a gap occurs between pages when the speed of the print processing decreases, in the case of using an electrophotographic printer engine, for example, there is a higher likelihood that the temperature of a fixing unit will decrease during printing, making temperature adjustment necessary, and a decrease in printing efficiency may also be incurred. Thus, even when the print processing is started, there is a risk that executing the print processing in a state in which the printing apparatus cannot exhibit its capability to the maximum will lead to a decrease in productivity.

On the other hand, the "Rip Then Print" mode is disadvantageous in that FPOT is certainly slower in comparison to the "Rip While Print" mode as described above. However, in the case of processing print data including image data that takes time in the image data rendering processing as well, the speed of the print processing does not decrease. In other words, in the "Rip Then Print" mode, any kind of print data can be printed at the maximum speed that the printer engine is capable of once the print processing starts. Also, for example, by performing copying processing and performing tasks such as sheet setting and calibration with the printing apparatus in the period from when the image data rendering processing ends to when the print processing is started, it is possible to achieve an improvement in the efficiency of printing the rendered image data.

Thus, the suitability of the "Rip While Print" mode and the "Rip Then Print" mode changes depending on the print data. However, it is difficult to determine which processing mode is suitable by merely glancing at the print data. Japanese Patent Laid-Open No. 2010-629 discloses that rendering processing for several pages of image data is performed starting from the beginning of a print job, and based on the result thereof, a printing apparatus automatically selects one of the above-described processing modes.

However, the above-described conventional technique does not designate a processing mode that is suitable for the entire print job, and depending on the print data included in the print job, there have been cases in which a processing mode not intended by the user is selected. Also, in particular, upon re-printing print data that was printed before, in some cases, the user has the experience of the previous time of printing and therefore can determine which processing mode is suitable for the printing. In view of this, it has also been proposed that the user is allowed to select the processing mode using an operation setting menu of the printing apparatus so that the user can select a desired processing mode. However, in this case as well, in order to switch the processing mode for each piece of print data, the user needs to change the operation setting of the printing apparatus each time, which is extremely inconvenient for the user.

SUMMARY OF THE INVENTION

An aspect of the present invention is to eliminate the above-mentioned problems with conventional technology.

A feature of the present invention is to provide a technique according to which it is possible to switch between executing rendering processing for rendering to image data and print processing in parallel, and executing print processing after the entire rendering processing for rendering to the image data is complete, for each print job.

According to a first aspect of the present invention, there is provided a printing apparatus comprising: a reception unit configured to receive a print job for which a processing mode is set; a determination unit configured to determine the processing mode set for the received print job; and a control unit configured to perform control such that, based on a result of determination performed by the determination unit, the print job is processed in a first processing mode in which rendering processing for rendering from print data to image data and print processing based on the rendered image data are executed in parallel, or in a second processing mode in which print processing based on the image data is executed after all of the processing for rendering from the print data to the image data is complete.

According to a second aspect of the present invention, there is provided a method of controlling a printing apparatus, comprising: receiving a print job for which a processing mode is set; determining the processing mode set for the received print job; and performing control such that, based on a result of determination performed in the determining, the print job is processed in a first processing mode in which processing for rendering from print data to image data and print processing based on the rendered image data are executed in parallel, or in a second processing mode in which print processing based on the image data is executed after all of the processing for rendering from the print data to the image data is complete.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram illustrating a "bookbinding imposition setting" of the first embodiment.

FIG. 10 is a diagram showing an example of a printer driver setting screen displayed on a PC according to a second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
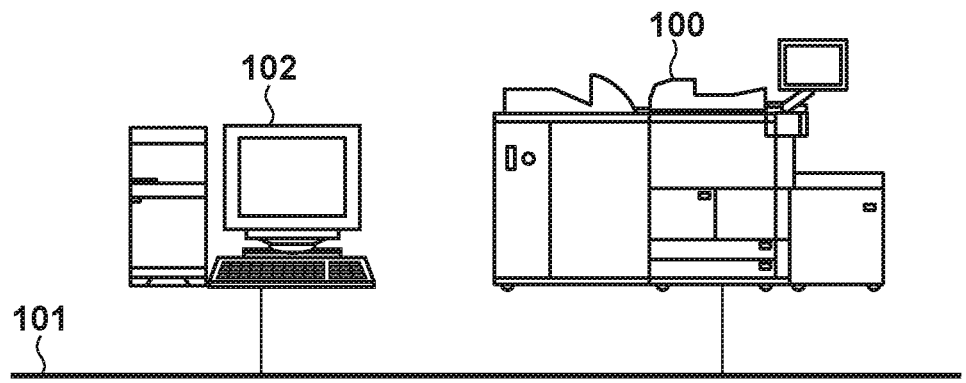
FIG. 1 is a diagram showing a configuration of a printing system according to a first embodiment of the present invention.

FIG. 1 is a diagram showing a configuration of a printing system according to a first embodiment of the present invention.

This printing system includes a printing apparatus 100 and a client computer 102 (hereinafter, PC 102), which are connected via a network 101. The PC 102 transmits a print job including PDL (page description language) code data to the printing apparatus 100 via the network 101. Similarly, it is also possible to transmit print jobs and the like expressed by settings called tickets, such as JDF (Job Definition Format) and JMF (Job Messaging Format) to the printing apparatus 100. Note that here, the printing apparatus 100 includes an image forming apparatus such as a multi-function processing apparatus (MFP) and a post-processing apparatus that executes post-processing such as bookbinding and punching on sheets subjected to printing by the image forming apparatus, but the printing apparatus 100 may be just a printing apparatus.

Figure 2:
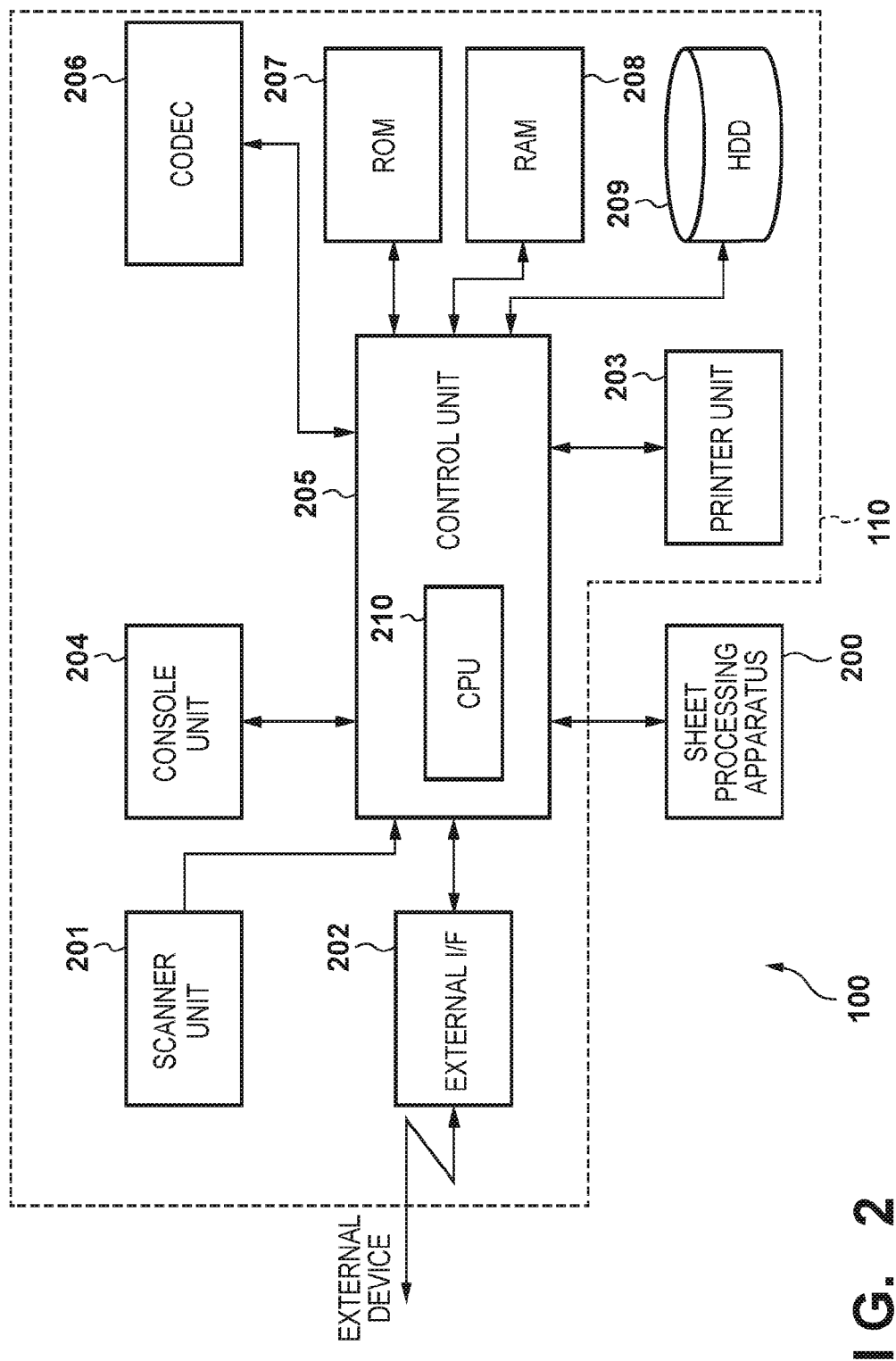
FIG. 2 is a block diagram for describing a configuration of a printing apparatus according to the first embodiment.

FIG. 2 is a block diagram for describing a configuration of the printing apparatus 100 according to the first embodiment.

The printing apparatus 100 includes an MFP 110, which is the portion surrounded by the dotted line in the drawing, and a sheet processing apparatus (post-processing apparatus) 200. Note that in the first embodiment, the printing apparatus 100 will be described taking, as an example, the MFP 110, which has multiple functions, such as a copying function and a printer function. However, the printing apparatus 100 may be a single-function printing apparatus with only a copying function or only a printer function. In the first embodiment, as an example, the printing apparatus 100 is equipped with various types of constituent elements, which will be described hereinafter.

With the printing apparatus 100, the sheet processing apparatus 200 can execute sheet processing on a sheet subjected to printing by the MFP 110. The sheet processing apparatus 200 is configured to be able to communicate with the MFP 110 and can execute various types of sheet processing according to instructions from the MFP 110. Examples of the sheet processing apparatus 200 include an apparatus that bundles multiple sheets subjected to printing by the MFP 110 and staples them together, and an apparatus that punches punch-holes into the sheets. It is also possible to use a configuration in which the sheet processing apparatus 200 is not equipped, and only a discharge tray for receiving the sheets subjected to printing by the MFP 110 in sequence is included.

A scanner unit 201 reads an image of an original, converts it into image data, and transfers it to another unit. An external I/F 202 exchanges data with another apparatus (external device) connected to the network 101. A printer unit 203 prints an image based on the input image data to a sheet. A console unit 204 has the configuration shown in FIG. 3, for example, receives an operation performed by a user, and displays messages and the like to the user.

A control unit 205 has a CPU 210 and performs overall control of the processes, operations, and the like of various types of units included in the printing apparatus 100. That is, the CPU 210 also controls the operation of the sheet processing apparatus 200 connected to the MFP 110. A ROM 207 stores various types of computer programs and the like to be executed by the CPU 210. For example, the ROM 207 stores programs for causing the CPU 210 to execute the various processes in a later-described flowchart, a display control program that is needed in order to display various types of screens that will be described later, and the like. Also, the ROM 207 stores a RIP program for executing an operation in which the CPU 210 interprets PDL data received from the PC 102 and renders it into Raster image data. Additionally, the ROM 207 stores a boot sequence, font information, and the like. A RAM 208 stores image data received from the scanner unit 201 and image data and PDL code data received via the external I/F 202, various types of programs loaded from the ROM 207 or the HDD 209, various types of setting information for apparatus operations, and the like. Also, the CPU 210 can read out these pieces of information stored in the RAM 208 and use them to perform control. Also, a part of the RAM 208 is configured as a non-volatile memory that is equipped with a small battery and thus can hold stored information even when the main power source is not being supplied, and various types of pieces of setting information for apparatus operations are stored in this part. An HDD (hard disk drive) 209 has a hard disk and a driving portion and the like that performs writing and reading of data to and from the hard disk. For example, the HDD 209 is used as a large-capacity storage apparatus that stores image data that is input from the scanner unit 201 and compressed by a codec 206. Also, the codec 206 performs compression and decompression of image data and the like stored in the RAM 208 and HDD 209 using various compression methods such as JBIG and JPEG, and performs control of PDL data analysis and rendering processing for rendering to Raster image data. Note that the codec 206 may be constituted by hardware or realized by the CPU 210 and a program.

Figure 3:
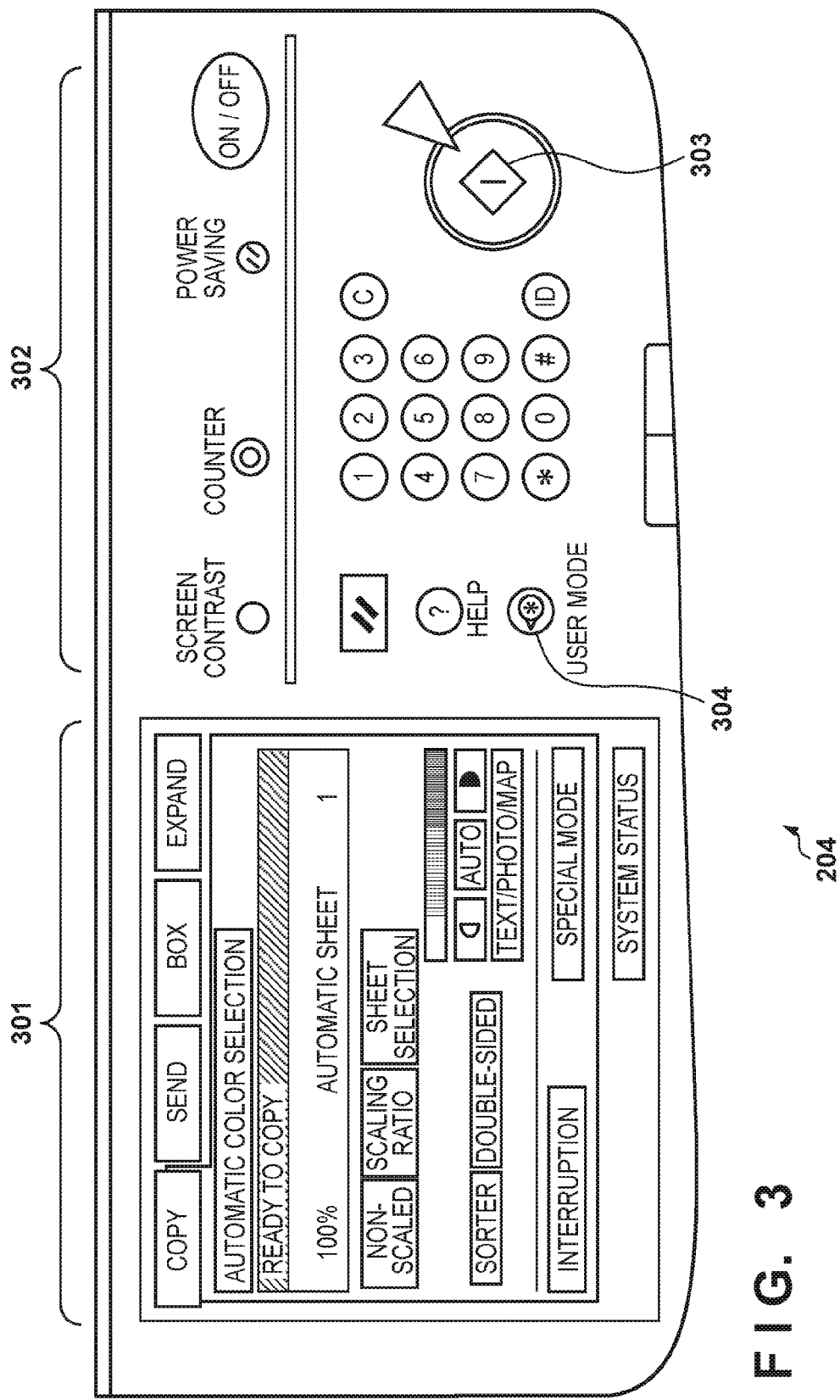
FIG. 3 depicts a top view of a console unit of the printing apparatus according to the first embodiment.

FIG. 3 depicts a top view of the console unit 204 of the printing apparatus according to the first embodiment.

The console unit 204 has a touch panel 301 and a hard key input unit (key input unit) 302. The console unit 204 receives instructions from the user via the touch panel 301 and the hard key input unit 302 and displays various types of information on the touch panel 301 as needed. Accordingly, the user can give an instruction via the console unit 204 to the printing apparatus 100 to perform processing such as copying. A start key 303 is a key for giving an instruction to start copying, transmission processing, and the like. A setting button 304 is a key for giving an instruction to display a list of setting items for the printing apparatus 100, including items for mode setting and the like, on the touch panel 301.

The following first embodiment will describe an operation of the printing apparatus 100 for receiving, from the PC 102, a print job to which information designating a processing mode has been added, and performing rendering processing and print processing for the image data with consideration given to the setting value for the processing mode set in the printing apparatus 100.

Figure 4:
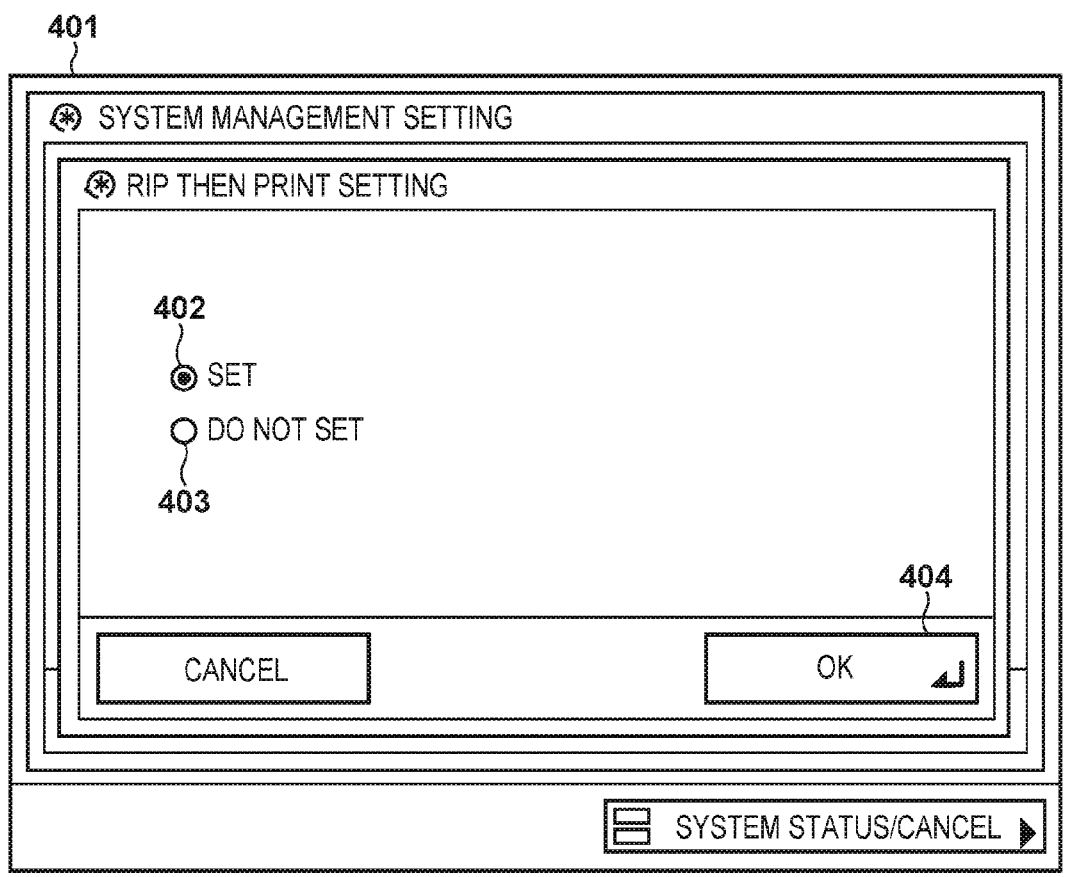
FIG. 4 is a diagram showing an example of a mode setting screen on which a touch panel unit of the console unit of the printing apparatus according to the first embodiment is displayed.

FIG. 4 is a diagram illustrating an example of a mode setting screen 401 displayed on the touch panel 301 of the console unit 204 of the printing apparatus 100 according to the first embodiment.

Here, radio buttons 402 and 403 for selecting whether or not to set to Rip Then Print, or in other words, the processing mode in which print processing is started after the rendering processing is complete, are displayed. Here, when the user selects the radio button 402 as shown in the drawing and touches the OK button 404, "Rip Then Print" mode is set. On the other hand, when the user selects the radio button 403 and presses the OK button 404, "Rip While Print" mode is set.

Figure 5:
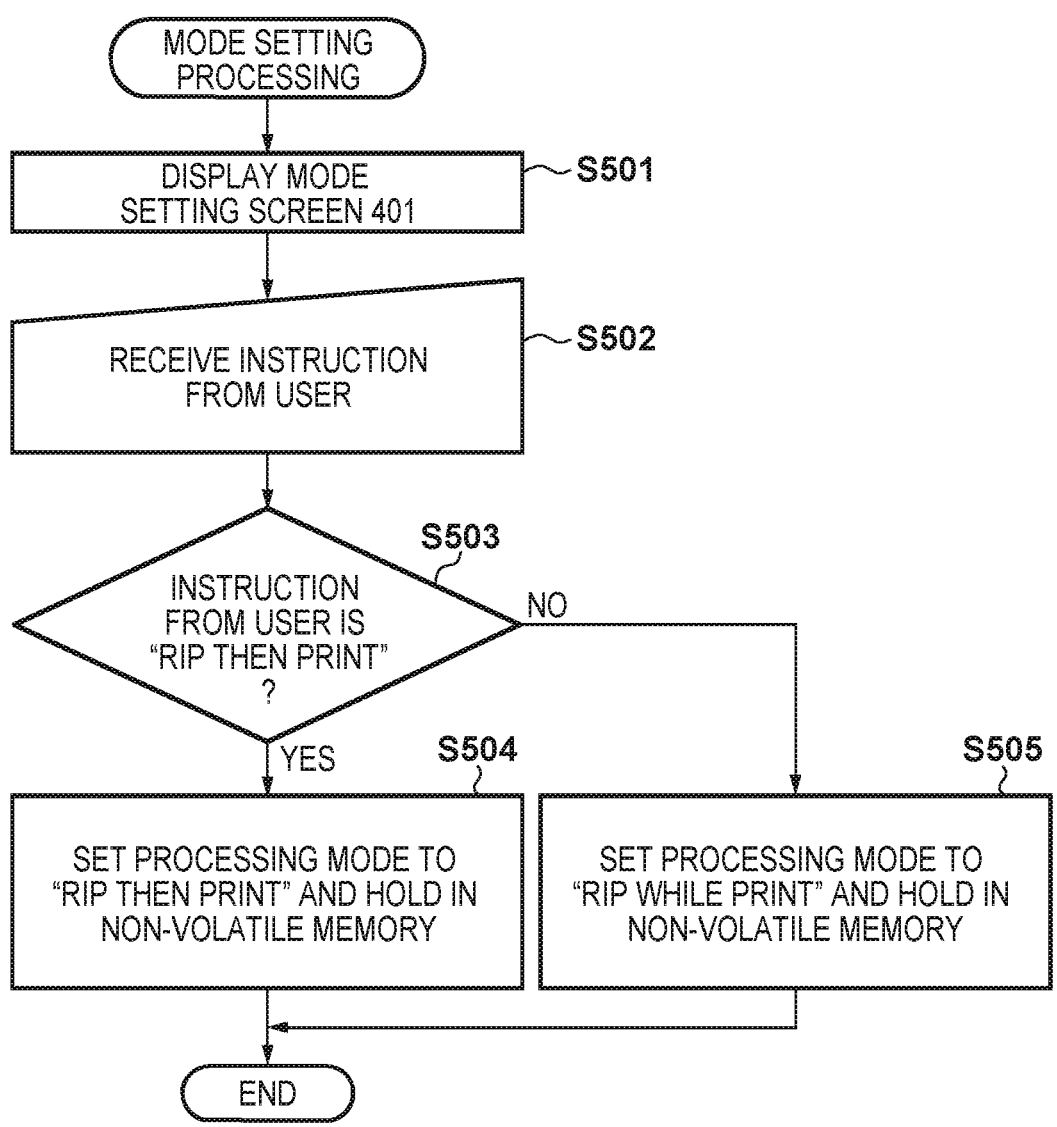
FIG. 5 is a flowchart for describing processing for setting a processing mode performed by the printing apparatus according to the first embodiment.

FIG. 5 is a flowchart for describing processing mode setting processing performed by the printing apparatus 100 according to the first embodiment. Note that the program for executing this processing is stored in the ROM 207, is deployed to the RAM 208 at the time of execution, and is executed under control performed by the CPU 210, and thus the processing indicated by the flowchart is achieved.

First, the user presses the setting button 304 provided on the hard key input unit 302 of the console unit 204 and causes a list (not shown) of setting items for a device, including the setting item for the processing mode, to be displayed on the touch panel 301 of the console unit 204. Then, the user selects the setting of the processing mode from the list of setting items and gives an instruction to start the setting task of the processing mode, whereby the processing is started. First, in step S501, the CPU 210 displays the mode setting screen 401 shown in FIG. 4 for example on the touch panel 301.

Next, the processing advances to step S502, and the CPU 210 receives an instruction from the user that is input via the mode setting screen 401. Next, the processing advances to step S503, and the CPU 210 determines whether or not the radio button 402 has been selected on the screen shown in FIG. 4, or in other words, whether or not "Rip Then Print" (printing after the completion of rendering processing) has been selected. If it is determined in step S503 that "Rip Then Print" has been selected, the processing advances to step S504, the CPU 210 stores the "Rip Then Print" mode in the above-described non-volatile memory region provided in the part of the RAM 208, and ends the processing. On the other hand, if it is determined in step S503 that "Rip Then Print" has not been selected, the processing advances to step S505. In step S505, the CPU 210 stores the "Rip While Print" (print in parallel with rendering processing) mode in the above-described non-volatile memory region provided in the part of the RAM 208 and ends the processing.

Next, a case will be described in which the printing apparatus 100 receives a print job for which the processing mode has been set from the PC 102 and performs printing.

Figure 6:
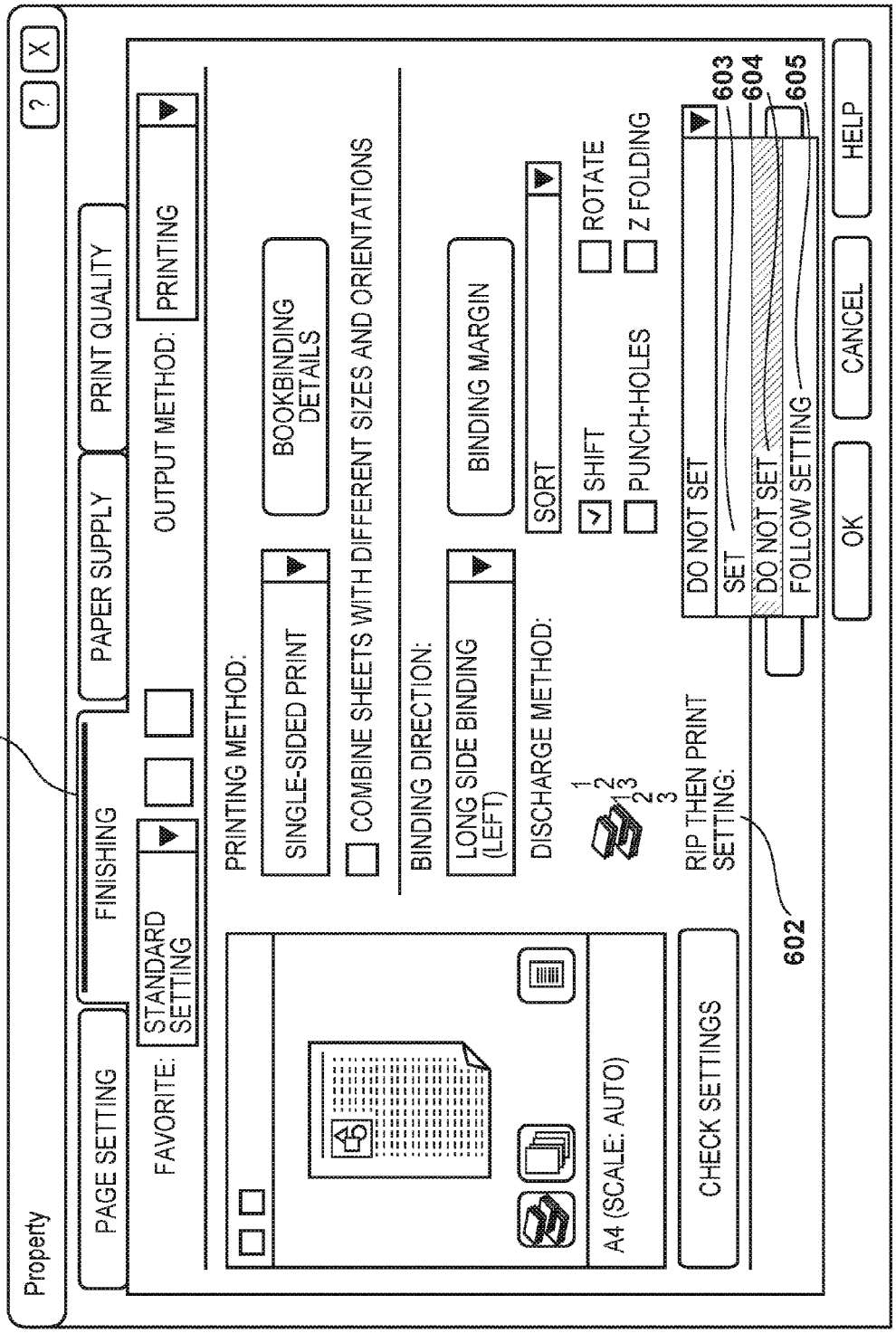
FIG. 6 is a diagram showing an example of a printer driver setting screen displayed on a PC according to the first embodiment.

FIG. 6 is a diagram showing an example of a printer driver setting screen displayed on the PC 102 according to the first embodiment.

Here, the user selects a finishing tab 601 and then selects a Rip Then Print setting 602 on the setting screen thereof, and thus the print data processing mode can be set. Here, the Rip Then Print setting 602 has a configuration in which an item is selected from a drop-down menu, and "Set" 603 means that a mode of "performing Rip Then Print" will be set. This has the same meaning as "Rip Then Print" described above. Also, "Do not set" 604 means that "Rip Then Print will not be performed", which has the same meaning as the above-described processing mode "Rip While Print". Also, "Follow setting" 605 is for giving an instruction to operate in accordance with the processing mode set by the user in the printing apparatus 100 via the processing described using the flowchart in FIG. 5.

Figure 7:
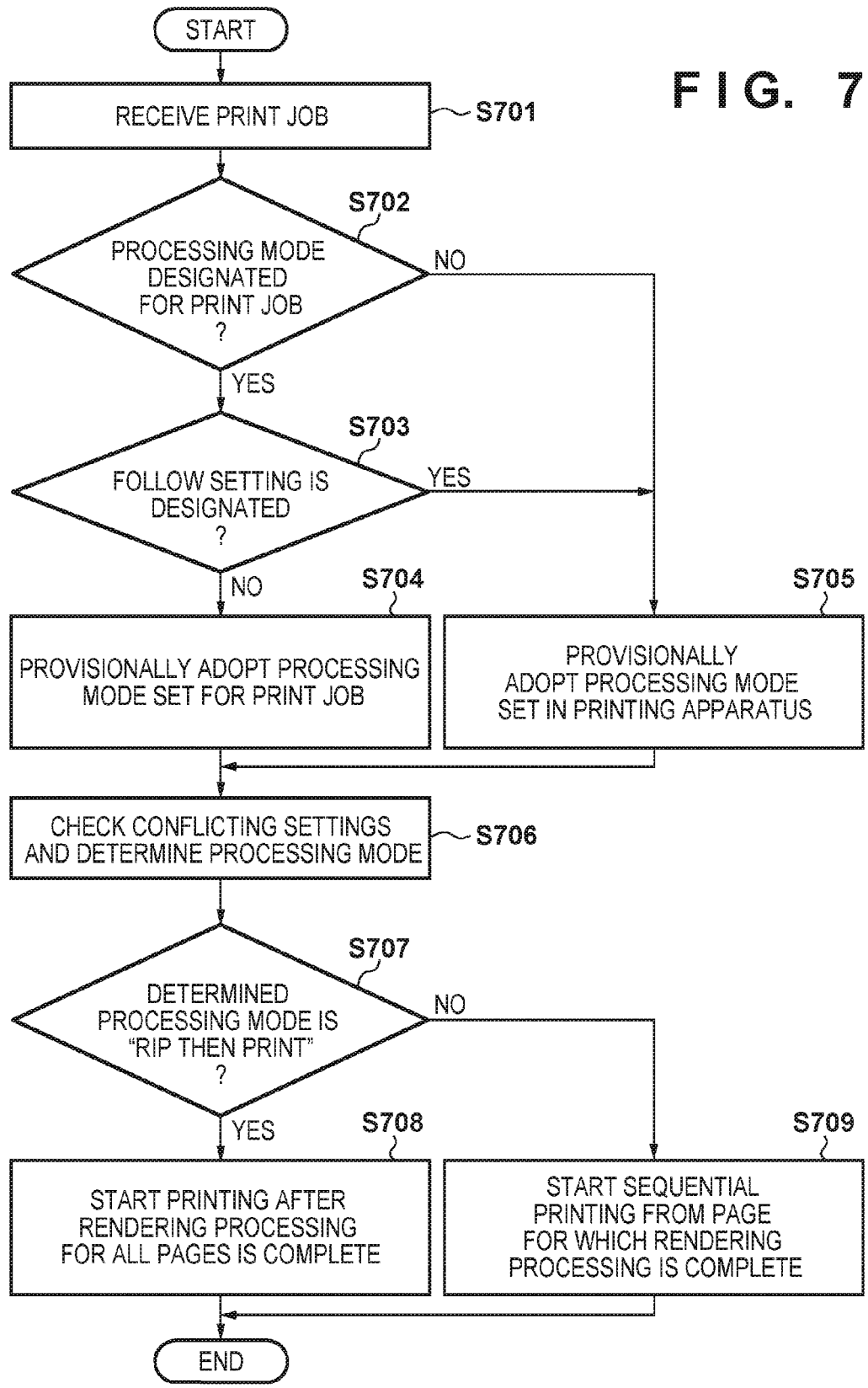
FIG. 7 is a flowchart for describing processing in which the printing apparatus according to the first embodiment receives a print job and performs printing.

FIG. 7 is a flowchart for describing processing in which the printing apparatus 100 according to the first embodiment receives a print job and performs printing. Note that the program for executing this processing is stored in the ROM 207, is deployed to the RAM 208 at the time of execution, and is executed under control performed by the CPU 210, and thus the processing indicated by the flowchart is achieved.

First, in step S701, through the external I/F 202, the CPU 210 receives a print job transmitted via the network 101 from the PC 102. At this time, the user of the PC 102 sets the processing mode for the print job via the printer driver screen shown in FIG. 6, for example. Upon receiving the print job for which the processing mode has been designated in this manner, if the processing mode is "follow setting", the printing apparatus 100 processes the print job and performs printing in accordance with the processing mode stored in the non-volatile memory region provided in the portion of the RAM 208.

Note that with the first embodiment, an example was described in which the processing mode is set in the print job via the printer driver setting screen as shown in FIG. 6. However, in addition, the processing mode may be set using a print ticket for the purpose of communicating the setting of the processing mode for the print job, as represented by JDF.

In step S702, the CPU 210 determines whether or not the processing mode has been set for the received print job. Here, if it is determined that the processing mode has not been designated, the processing advances to step S705, the processing mode held in the non-volatile memory region in step S504 or step S505 described above is applied to the print job, and the processing advances to step S706. Note that the processing of step S705 is part of exceptional case processing. In the first embodiment, the PC 102 uses the printer driver setting screen shown in FIG. 6, for example, and therefore a circumstance in which the processing mode is not set for the print job does not occur normally. However, a case is also conceivable in which a print job is input to the printing apparatus 100 by a printer driver not having the function of the RIP then print setting 602 of FIG. 6. Also, there are many printing systems that have a direct print function in which PDL data or a file such as a PDF is printed by being transmitted to the printing apparatus 100 directly instead of via a printer driver. If a print job is input to the printing apparatus 100 with such methods, it is also possible that the processing mode is not set for the print job. For this reason, processing such as step S702 and step S705 is needed.

On the other hand, if the CPU 210 determines in step S702 that a processing mode has been designated for the received print job, the processing advances to step S703, and the CPU 210 determines whether or not the setting is "follow setting" 605. If the CPU 210 determines in step S703 that "follow setting" 605 has been set, the processing advances to step S705, the processing mode held in the non-volatile memory region in step S504 or step S505 described above is provisionally applied to the print job, and the processing advances to step S706.

On the other hand, if it is determined in step S703 that "follow setting" 605 has not been set, the processing advances to step S704, and the CPU 210 provisionally adopts the processing mode set for the print job as the processing mode to be applied to the print job. Next, the processing advances to step S706, and the CPU 210 performs checking of conflicting settings and ultimately determines the processing mode to be applied to the print job. Here, examples of conflicting settings include a "reverse order output setting" relating to the printing sequence and a "bookbinding imposition setting" relating to post-processing.

Figure 8:
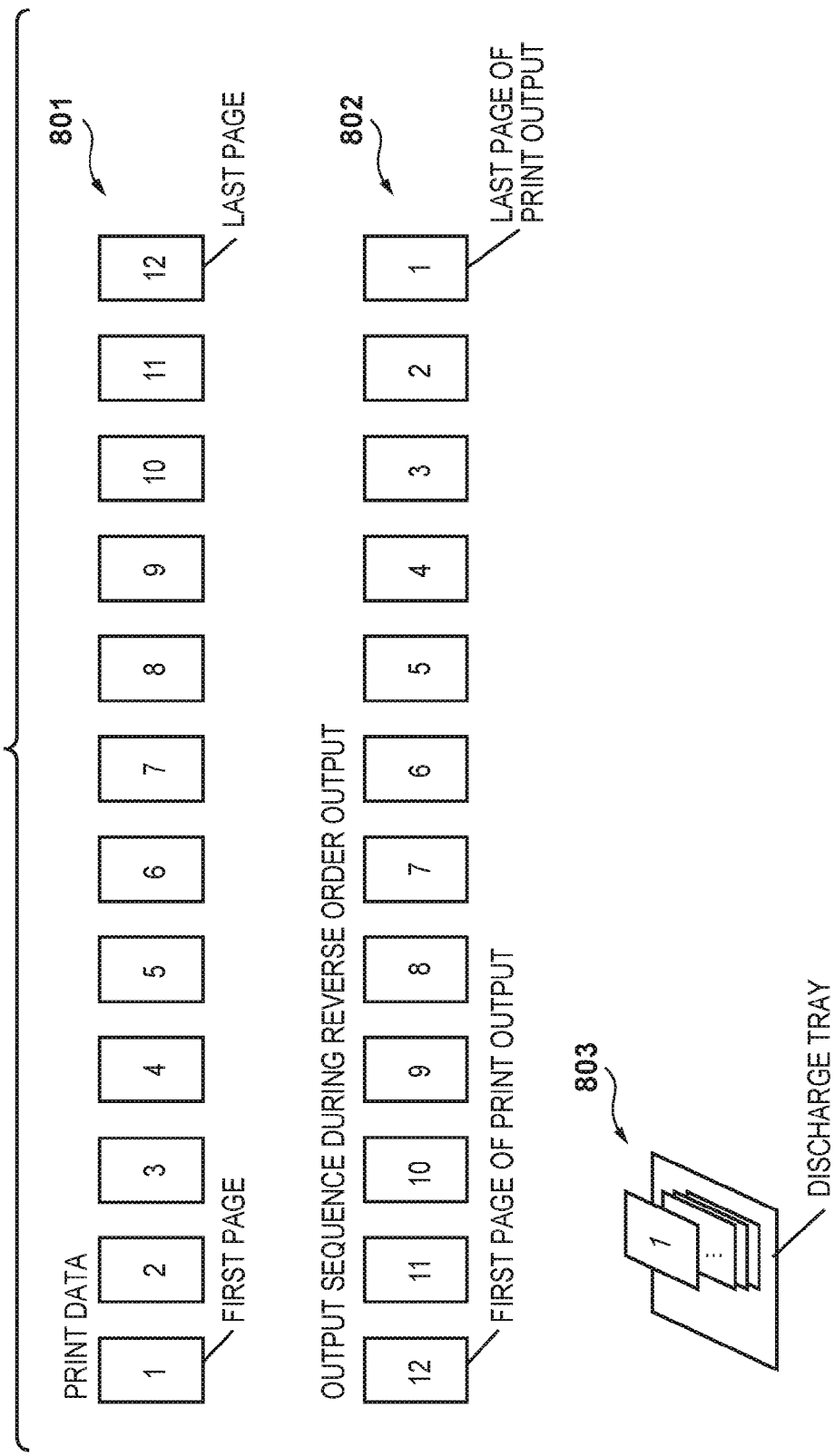
FIG. 8 is a diagram illustrating a "reverse order output setting" of the first embodiment.

FIG. 8 is a diagram for describing the "reverse order output setting" of the first embodiment.

The "reverse order output setting" is a function of, in the case of a print job including print data indicated by reference numeral 801 in FIG. 8 for example, as indicated by reference numeral 802, first printing and outputting the final page of the print data and thereafter sequentially performing printing and output in order from the last page to the first page. This function is often used to create a product (bundle of printed materials) in which the page printed last (top page of the document) faces upward as indicated by reference numeral 803 by being furthermore discharged onto the discharge tray with the discharge surface (printing surface) facing upward.

However, because the printing apparatus 100 simply sequentially performs the rendering processing for the image data starting from the first page of the received print data, in order to perform reverse order output, the printing apparatus 100 needs to start printing after waiting for the rendering processing for the image data of the last page, which is the page to be printed first, to end. That is, it is necessary to perform an operation similar to that in the "Rip Then Print" mode. For this reason, the "reverse order output designation" and "Rip While Print" mode are conflicting settings that are incompatible with each other.

FIG. 9 is a diagram illustrating the "bookbinding imposition setting" of the first embodiment.

The bookbinding imposition setting is a function in which, in the case of a print job including print data as indicated by reference numeral 901 in FIG. 9 for example, the print data is laid out on double-sized sheets as indicated by reference numeral 902, furthermore subjected to double-sided printing, and output, for example. As indicated by reference numeral 903, this function is used to create products that will be a bookbinding product (right-opening in the layout method of the first embodiment) when the products (bundle of printed materials) are folded in half. However, as can be understood by viewing reference numeral 902, which is the result of bookbinding imposition, the number of pages included in the print data needs to be established in order to determine which pages are to be paired up to generate the printing images (in order to determine how imposition is to be performed). Depending on the total number of pages, there are many cases in which the final page (page 12 in FIG. 12) of the print data is imposed on a sheet that is to be printed first, as indicated by reference numeral 902, which is the result of bookbinding imposition. For this reason, it is necessary to perform imposition after waiting for the rendering processing for the image data of the final page to end, and then start printing. That is, an operation similar to "Rip Then Print" needs to be performed similarly to the above-mentioned reverse order output setting, and bookbinding imposition is a conflicting setting that is not compatible with "Rip While Print" mode.

Thus, if the "Rip While Print" mode is designated as the processing mode and a setting in conflict therewith is furthermore set, the designation of the "Rip While Print" mode is ignored in the first embodiment. That is, by switching the processing mode to "Rip Then Print", the processing mode to be applied to the print job is determined. Of course, it is also possible to perform control such that the print job is canceled, being treated as a setting error. However, in the first embodiment, value was given to the fact that a printed product in a designated format can be generated even though a slightly larger amount of time is taken due to performing control such that priority is given to another designation over the setting of the processing mode.

The description will return once again to the flowchart in FIG. 7. In step S706, the CPU 210 ultimately determines the processing mode for the print job, the processing advances to step S707, and the CPU 210 determines whether or not the determined processing mode is "Rip Then Print". Here, if it is determined that it is the "Rip Then Print" mode, the processing advances to step S708, the CPU 210 controls the printing apparatus 100 such that printing is started after the rendering processing for the image data of all of the pages included in the print job is complete, and the processing ends.

Here, additional description will be given for the processing of step S708, with reference to the block diagram in FIG. 2. First, the CPU 210 performs processing in which the PDL data of the print job received in step S701 is transferred in sequence to the codec 206 page by page starting from the first page, and is rendered into image data. In parallel with this, the CPU 210 sequentially stores the data of the pages for which the rendering processing for the image data performed by the codec 206 has ended in the HDD 209. Also, when the rendering processing for the image data of all of the pages included in the print job is complete, the CPU 210 performs control such that the image data of the pages that have been subjected to the rendering processing and are stored in the HDD 209 is read out, output to the printer unit 203, and printing is executed.

On the other hand, if the CPU 210 determines in step S707 that it is not the "Rip Then Print" mode, the processing advances to step S709, the CPU 210 performs control such that the print job is subjected to printing in sequence starting with the pages for which the rendering processing for the print data is complete, and the processing ends.

Here, additional description will be given for the processing of step S709, with reference to the block diagram in FIG. 2. First, the CPU 210 performs processing in which the PDL data of the print job received in step S701 is transferred in sequence to the codec 206 page by page starting from the first page, and is rendered into image data. In parallel with this, the CPU 210 sequentially stores the image data of the pages for which the rendering processing for rendering into the image data performed by the codec 206 has ended in the HDD 209. Furthermore, in parallel with these processes, the CPU 210 performs control such that the image data for the pages that have been subjected to the rendering processing and are stored in the HDD 209 is read out, output to the printer unit 203, and printing is performed.

Thus, with the first embodiment, the user can easily switch the processing mode for each print job by attaching the setting of the processing mode to the print job and inputting it to the printing apparatus, and therefore user-friendliness for the user is improved. Also, for each print job, it is possible to automatically set a mode of sequentially printing rendered pages or a mode of starting printing after all of the pages have been rendered, and therefore an improvement in the productivity of the entire printing task can be expected.

Second Embodiment

Hereinafter, a second embodiment for carrying out the present invention will be described. In the above-described first embodiment, a mode was described in which the user inputs a print job to the printing apparatus 100 and executes immediate print processing using the printing apparatus 100. On the other hand, in addition to immediate printing, the printing apparatus 100 also has a job hold function in which a received print job is first stored in the HDD 209, and printing is performed based on the stored print job at a later time. In view of this, the second embodiment will describe processing according to a setting of a processing mode in the case of using this job hold function. Note that the configuration of the printing system, the configuration of the printing apparatus 100, and the like in the second embodiment are similar to that of the first embodiment described above, and therefore description thereof will not be included here.

First, the job hold function is a function in which the printing apparatus 100 holds a received print job, as described above. At this time, the control unit 205 (CPU 210) of the printing apparatus 100 does not start print processing based on the print job upon receiving the print job, but the image data is rendered by the codec 206 similarly to the case of printing the PDL data included in the print job. Then, the control unit 205 performs control such that the image data of the pages rendered by the codec 206 is stored sequentially in the HDD 209. That is, the print job held in the printing apparatus 100 is held in a state in which the rendering processing for rendering into image data is complete. For this reason, display of a more accurate preview image can be performed based on the rendered image data, and since the image data rendering processing is already complete when printing is furthermore started, printing can be started quickly. However, if the print setting is changed, there is a possibility that it will become necessary to perform processing for rendering the image data once again before the printing of the print job. Note that in the second embodiment, a configuration was used in which the user of the PC 102 can use the job hold function by designating HOLD in output method setting 1001 via the printer driver screen shown in FIG. 10 and inputting a print job into the printing apparatus 100.

FIG. 10 is a diagram showing an example of a printer driver setting screen displayed on a PC 102 according to a second embodiment.

The output method setting 1001 is for designating the method for processing the print job in the printing apparatus that has received the print job, and "HOLD" gives an instruction to execute the above-described job hold function.

As another function related to the job hold function, there is a forced job hold function in which even a print job input to the printing apparatus is mandatorily held in a pre-printing state by the printing apparatus 100. The forced job hold function is for achieving an effect of improving security by preventing printed materials from being left out, and an effect of cost reduction. At the same time, the forced job hold function is also for realizing a work flow in which a print job is first input to the printing apparatus 100 and the detailed print settings are performed once again when printing is actually executed. It is also for realizing a work flow in which an input print job is transferred to another printing apparatus in response to congestion in the printing apparatus 100 and is printed. Thus, since consideration is given to an application in which the print setting is changed later or printing is executed after performing transmission to another printing apparatus, when a print job is held using the forced job hold function, the print job is held in a state of not yet being rendered into image data. That is, if the forced job hold function is enabled, the control unit 205 stores the received print job as-is in the HDD 209. Note that in the second embodiment, the user selects the radio button 1102 for enabling the forced job hold function and presses the OK button 1103 on the setting screen 1101 shown in FIG. 11, thereby enabling the forced job hold function. Note that the processing for setting the forced job hold function in the printing apparatus 100 can be realized in almost the same manner as the processing described with reference to the flowchart in FIG. 5 of the above-described first embodiment, and the setting value is held in the non-volatile memory region provided in the portion of the RAM 208.

Figure 11:
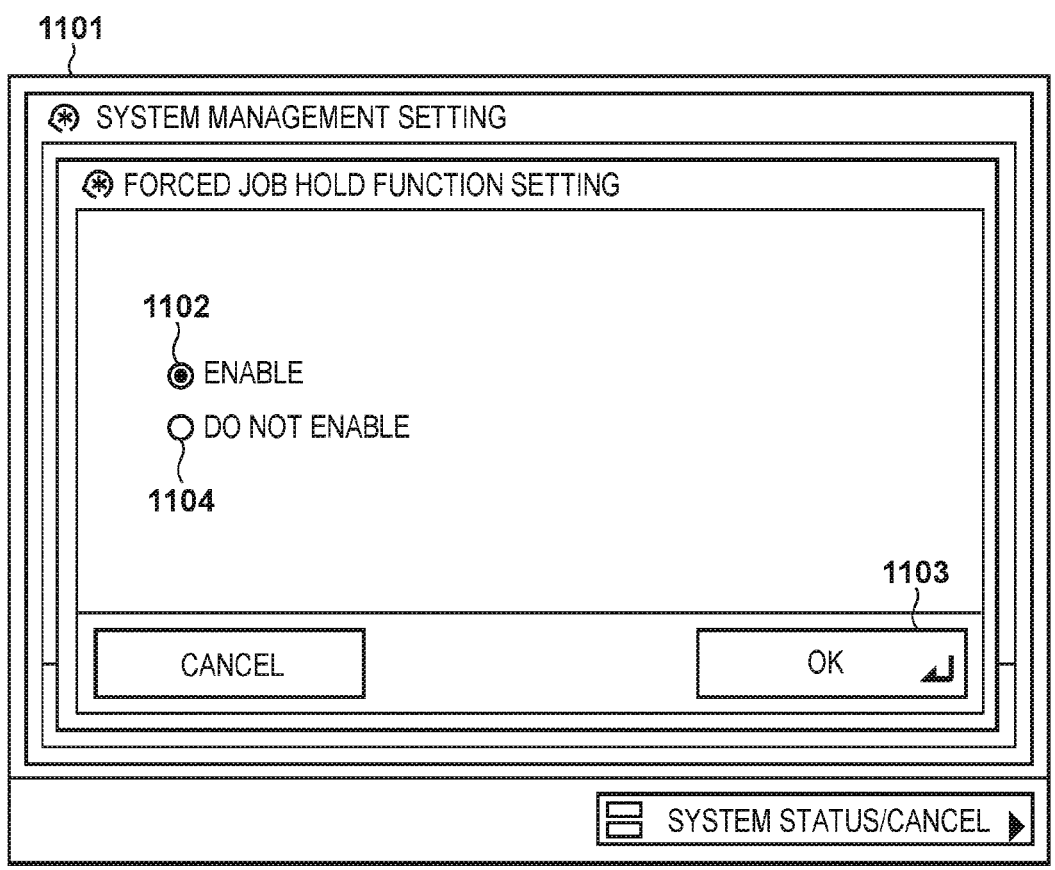
FIG. 11 is a diagram showing an example of a forced job hold function setting screen on which a touch panel unit of a console unit of a printing apparatus according to the second embodiment is displayed.

FIG. 11 is a diagram showing an example of a forced job hold function setting screen 1101 displayed on the touch panel 301 of the console unit 204 of the printing apparatus 100 according to the second embodiment.

The radio button 1102 is a button for selecting to enable the forced job hold function and a radio button 1104 is a button for selecting to not enable the forced job hold function. The user can enable or disable the forced job hold function by selecting one of the radio buttons 1102 and 1104 and pressing the OK button 1103.

Figure 12:
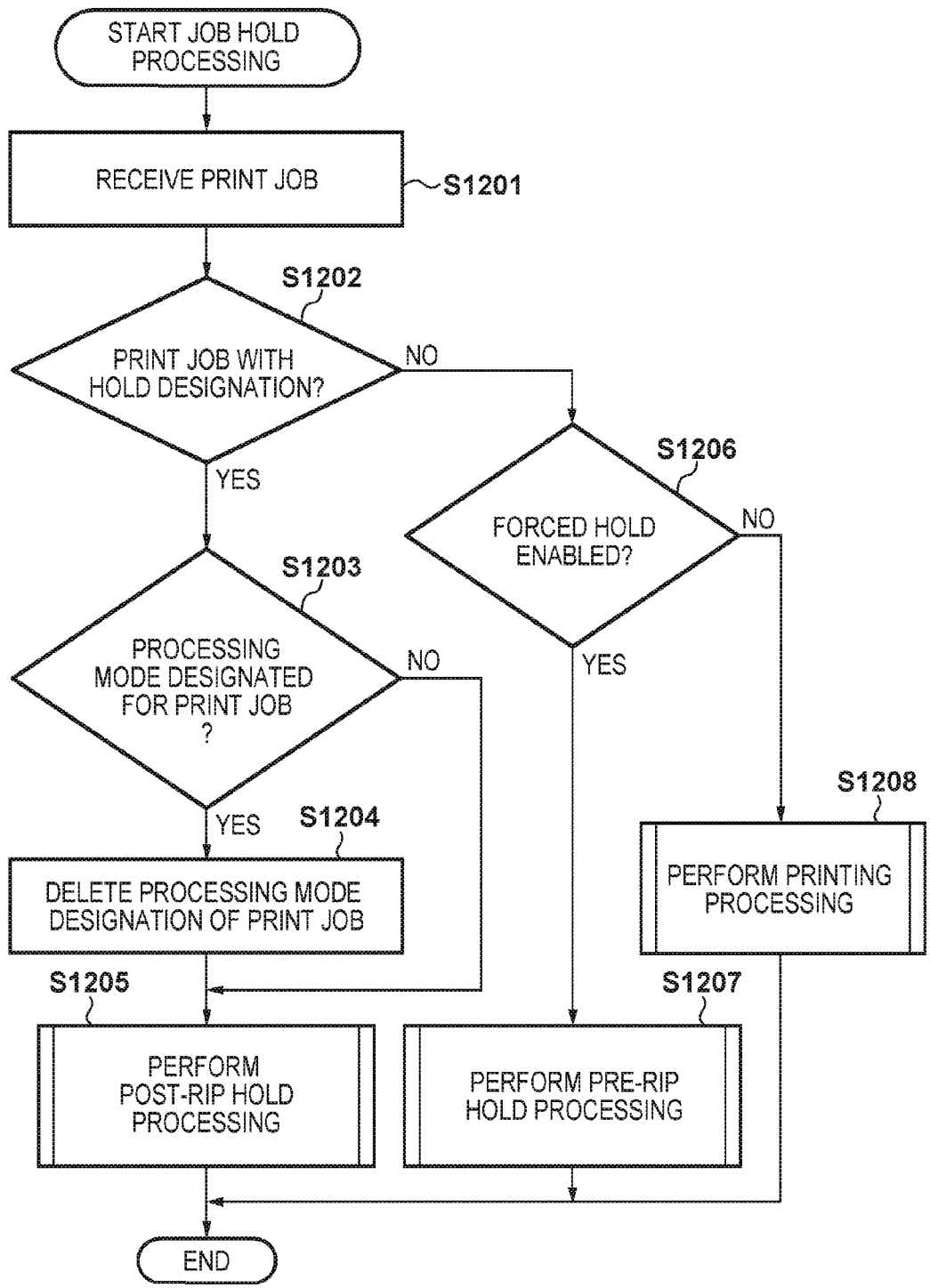
FIG. 12 is a flowchart for describing processing in which the printing apparatus according to the second embodiment executes a print job.

FIG. 12 is a flowchart for describing processing in which the printing apparatus 100 according to the second embodiment executes a print job. Note that the program for executing this processing is stored in the ROM 207, is deployed to the RAM 208 at the time of execution, and is executed under control performed by the CPU 210, and thus the processing indicated by the flowchart is achieved.

First, in step S1201, through the external I/F 202, the CPU 210 receives a print job transmitted from the PC 102 via the network 101. Next, the processing advances to step S1202, and the CPU 210 determines whether or not the received print job is a print job for which job hold has been designated. Here, the job hold designation is designated by the user of the PC 102 via the printer driver screen shown in FIG. 10 described above, for example. If the CPU 210 determines in step S1202 that job hold has been designated for the print job, the processing advances to step S1203, and the CPU 210 determines whether or not the above-described processing mode has been designated for the print job. The processing of step S1203 is the same as the processing of step S702 in FIG. 7 described above. Here, if it is determined that the processing mode has been designated, the processing advances to step S1204, and the CPU 210 deletes the designation of the processing mode set for the print job. For example, in the example shown in FIG. 10, hold job is designated using "HOLD" in the output method setting 1001, and the "Rip Then Print" radio button 1002 is selected, but the "Rip Then Print" setting will be ignored.

Next, the processing advances to step S1205, and the CPU 210 renders the print data of the print job into image data and stores the rendered image data in the HDD 209. Also, the processing ends with a job hold in which the print processing based on the print job is not executed until an instruction to start printing is received. Note that the job hold processing performed in step S1205 is post-rip hold processing in which, as described above, the print data included in the print job is rendered (converted) into image data and thereafter the image data is stored. For this reason, no matter what is designated in the processing mode, the rendering processing for all pages of the image data is complete at the time of performing printing, and therefore the operation of printing does not change. In view of this, for the purpose of conserving memory use and avoiding confusion, in step S1204, the setting of the processing mode is deleted from the setting of the print job before storing the print job. Note that if it is determined in step S1203 that no processing mode has been designated for the print job, the processing advances from step S1203 to step S1205, the CPU 210 performs post-rip hold processing, and the processing ends.

On the other hand, if the CPU 210 determines in step S1202 that the print job is not a print job for which job hold is designated, the processing advances to step S1206. In step S1206, the CPU 210 determines whether or not the information for the forced job hold function that is set by the user via the screen of the above-described FIG. 11 and is held in the non-volatile memory region is for enabling the forced job hold function. If the CPU 210 determines in step S1206 that the forced job hold function has been enabled, the processing advances to step S1207, the CPU 210 performs pre-rip hold processing on the print job, and the processing ends. The pre-rip hold processing carried out in step S1207 is processing in which, as described above, the print job is held as-is without performing processing for rendering the print data of the print job into image data. At this time, if the processing mode has been set for the print job, the print job is held along with the setting thereof, and thereafter, when print output based on the print job is to be executed, the processing mode is referenced during the print processing as the setting of the print job. Also, if the CPU 210 determines in step S1206 that the forced job hold function was not enabled by the printing apparatus 100, the processing advances to step S1208, the CPU 210 executes the print processing by processing the print job as a normal print job, and the processing ends. Note that the processing of step S1208 is similar to the content described in the above-described first embodiment, and therefore description thereof will be omitted here.

As described above, according to the second embodiment, the job hold function designated for the print job is given priority over the forced job hold function set by the printing apparatus. Also, in the case of performing Rip Then Hold processing, the processing mode set for the print job is not held. Accordingly, not storing setting information that is not significant prevents memory regions from being consumed needlessly. Also, by not storing the received print job and the setting information that is not significant, it is possible to prevent a case in which the user is confused by the print settings at the time of printing the print job.

Other Embodiment

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-146080, filed Jul. 23, 2015, which is hereby incorporated by reference herein in its entirety.

What is claimed is:

1. A printing apparatus comprising:
a network external that receives, from an internal device, a print job including one of first setting information specifying a first process and second setting information specifying a second process; and
a controller that performs, according to the first setting information included in the received print job, the first process of rendering a page of the received print job and then printing the rendered page without waiting for a completion of rendering of all pages of the received print job, and performs, according to the second setting information included in the received print job, the second process of rendering all the pages of the received print job and then printing all the rendered pages,
wherein the controller performs, according to third setting information included in the received print job, the second process.

2. The printing apparatus according to claim 1, wherein the first setting information and the second setting information are represented by Job Definition Format.

3. The printing apparatus according to claim 1, wherein the controller sets the first process or the second process, and
wherein if neither the first setting information nor the second setting information is included in a received print job and any setting information affecting whether to perform the first process or the second process is not included in the received print job, the controller performs the first process or the second process according to a setting.

4. The printing apparatus according to claim 3, wherein the controller stores, in a non-volatile manner, content of the setting.

5. The printing apparatus according to claim 1, wherein the third setting information is different from the first setting information and the second setting information, and causes a print sequence of all the pages of the received print job to be in reverse order, and the controller performs, according to the third setting information included in the received print job, the second process even though the first setting information is included in the received print job.

6. The printing apparatus according to claim 1, wherein the third setting information is different from the first setting information and the second setting information, and causes bookbinding imposition as post-processing of all printed pages of the received print job, and the controller performs, according to the third setting information included in the received print job, the second process even though the first setting information is included in the received print job.

7. The printing apparatus according to claim 1, wherein the controller performs rendering of all the pages of the received print job and holds all the rendered pages if the received print job includes a hold designation.

8. The printing apparatus according to claim 7, wherein all the held pages are printed according to an instruction from a user.

9. The printing apparatus according to claim 1, wherein the controller:
enables a setting such that a received print job is to be held without printing any page of the print job; and
holds, according to the enabled setting, the received print job without rendering all the pages of the received print job.

10. The printing apparatus according to claim 9, wherein the controller:

performs, according to the first setting information included in the held print job, the first process of rendering a page of the held print job and then printing the rendered page without waiting for a completion of rendering of all pages of the held print job;
performs, according to the second setting information included in the held print job, the second process of rendering all the pages of the held print job and then starting to print all the rendered pages; and
performs, according to the third setting information included in the held print job, the second process.

11. The printing apparatus according to claim 10, wherein the controller holds, according to the enabled setting, the received print job forcedly.

12. The printing apparatus according to claim 1, wherein the print job including one of the first setting information and the second setting information is created by the external device.

13. A method of controlling a printing apparatus, comprising:
receiving, from an external device, a print job including one of first setting information specifying a first process and second setting information specifying a second process;
according to the first setting information included in the received print job, performing the first process of rendering a page of the received print job and then printing the rendered page without waiting for a completion of rendering of all pages of the received print job;
according to the second setting information included in the received print job, performing the second process of rendering all the pages of the received print job and then starting to print all the rendered pages; and
according to third setting information included in the received print job, performing the second process.

14. The method according to claim 13, wherein the first setting information and the second setting information are represented by Job Definition Format.

15. The method according to claim 13, further comprising:
accepting, via a user interface of the printing apparatus, a selection of the first process or the second process from a user; and
if neither the first setting information nor the second setting information is included in a received print job and any setting information affecting whether to perform the first process or the second process is not included in the received print job, performing the first process or the second process according to the selection by the user.

16. The method according to claim 13, wherein, even though the first setting information is included in the received print job, the second process is performed according to the third setting information included in the received print job.

17. The method according to claim 13, further comprising:
enabling a setting such that a received print job is to be held without printing any page of the print job;
according to the enabled setting, holding the received print job without rendering all the pages of the received print job; and
according to the first setting information included in the held print job, performing the first process of rendering a page of the held print job and then printing the rendered page without waiting for a completion of rendering of all pages of the held print job;

according to the second setting information included in the held print job, performing the second process of rendering all the pages of the held print job and then starting to print all the rendered pages; and according to the third setting information included in the held print job, performing the second process.

18. The method according to claim 17, further comprising:

according to fourth setting information further included in the received print job, rendering all the pages of the received print job and holding all the rendered pages without printing any page of all the rendered pages; and according to a print start instruction from a user, printing the held rendered pages.

19. The method according to claim 17, wherein the enabling of the setting is performed via a user interface of the printing apparatus.

20. The method according to claim 17, wherein the holding holds the received print job forcedly.

21. The method according to claim 13, wherein the print job including one of the first setting information and the second setting information is created by the external device.

22. The method according to claim 13, wherein the third setting information is different from the first setting information and the second setting information.

\* \* \* \* \*